UNITED STATES PATENT OFFICE.

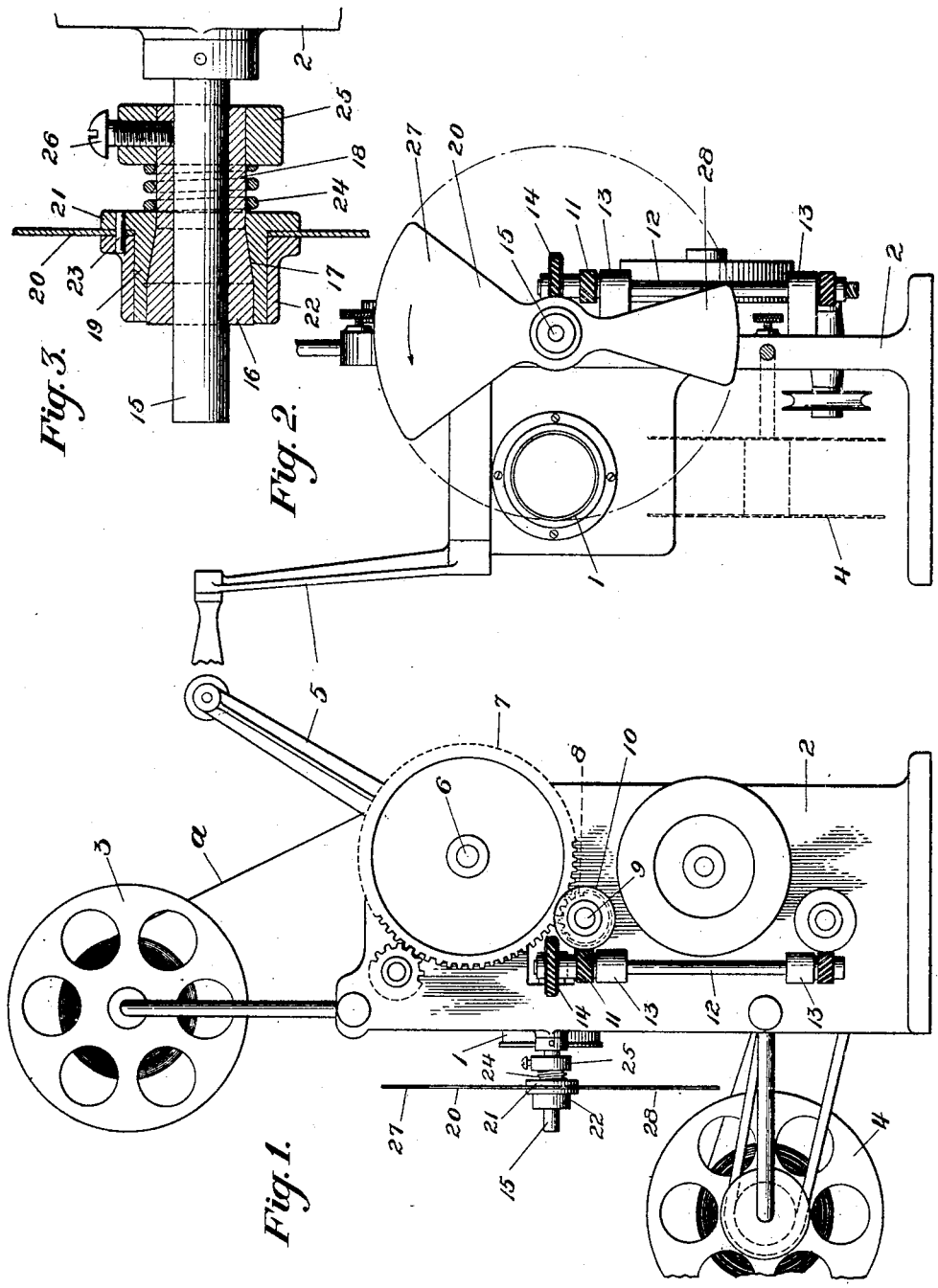

JOHN DARBY, OF SUMMIT, NEW JERSEY, ASSIGNOR TO FRANCIS B. GRIFFIN AND EDWARD C. WALLACE, BOTH OF NEW YORK, N. Y.

MOVING-PICTURE MACHINE.

1,174,480.  Specification of Letters Patent.  Patented Mar. 7, 1916.

Application filed January 26, 1914, Serial No. 814,429. Renewed August 19, 1915. Serial No. 46,351.

*To all whom it may concern:*

Be it known that I, JOHN DARBY, a citizen of the United States, residing at Summit, in the county of Union and State of New Jersey, have invented certain new and useful Improvements in Moving-Picture Machines, of which the following is a specification.

The invention relates to moving picture machines and more especially to shutter mechanisms and coöperating devices for use in a picture projecting machine, although in certain aspects thereof the invention may be applicable to a picture taking machine.

The objects and advantages of the invention will be set forth in part hereinafter in connection with the description and in part will be obvious to those skilled in the art, such objects and advantages being attained and realized through the combinations and instrumentalities set out in the appended claims and those coöperating therewith.

The invention consists in the novel parts, arrangements, constructions, combinations and improvements herein shown and described.

The accompanying drawings, referred to herein and forming a part hereof, illustrate an embodiment of the invention, and with the description serve to illustrate the principles thereof.

Of the drawings:—Figure 1 is a side elevation of a moving picture projecting machine having a shutter mechanism constructed in accordance with the invention; Fig. 2 is a view looking at Fig. 1 from the left; and Fig. 3 is a fragmentary sectional view of the shutter supporting and adjusting devices.

Referring by way of example to the accompanying drawings, the projecting lens tube is indicated by reference numeral 1, said lens tube being suitably supported upon the frame 2 of the machine. Said tube is equipped with proper lenses in a well-known manner, and a suitable source of light (not shown) is provided.

A film strip *a* is intermittently fed and positioned in proper relation to the tube 1 by suitable mechanism of any approved form (details thereof not being shown), the film strip being unwound from a reel 3 and rewound upon a reel 4. Suitable motive power is provided, as by a hand-turned crank 5, which serves to feed and stop the film and to rotate the shutter in proper time relation with each other.

The crank 5 is connected to a shaft 6, carrying a gear wheel 7, the gear wheel 7 meshing with a spur pinion 8 on a shaft 9. Fixed also on the shaft 9 to rotate with the pinion 8 is a gear wheel 10 having helical gear teeth. Meshing with the gear wheel 10 is a pinion 11 having corresponding helical gear teeth, said pinion 11 being carried upon and driving the shaft 12, which shaft 12 is mounted in supports 13 on the machine frame. Fixed to the shaft 12 is a helical gear 14 meshing with a corresponding gear upon the shaft 15 upon which shaft 15 the shutter is supported and by which it is rotated. Suitable connections are provided from a shaft 6 to the intermittent film feeding devices, thus causing the parts to move in proper time relation one with the other.

Means are provided by the invention for the rapid easy and accurate adjustment of the shutter angularly with respect to its shaft 15. In conjunction or coöperation with such means, provision is also made whereby the entire shutter is adjustable longitudinally or axially with respect to its shaft. As embodied, a detachable member or sleeve 16, embraces the shaft 15, said sleeve 16 having a portion 17 of its exterior of conoidal shape, and having another portion 18 of its exterior of cylindrical shape or form, the smaller end of said conoidal portion joining said cylindrical portion, as will be clear by reference to Fig. 3. Said conoidal portion on the exterior of the sleeve 16 serves as a frictional holding device for holding the shutter to its shaft to rotate therewith, and a suitable frictional member with which latter member the shutter rotates, is yieldingly pressed into engagement with said conoidal portion 17 when the device is in operation. As embodied, a sleeve 19 encircles the sleeve 16, the shutter 20 being fixed to the sleeve 19 in a suitable manner. As shown the sleeve 19 has a circular flange or ring fixed thereto or integral therewith and extending out angularly or radially therefrom. The shutter 20 has an opening therein fitting snugly the sleeve 19, the shutter itself resting against the face of the flange 21. A ring or collar 22 may then be forced over the sleeve 19, and said ring 22, the ring 21 and the shutter 20 may be fastened together by screws or pins 23.

The sleeve 19 is formed interiorly with a conoidal portion adapted to fit closely the conoidal portion 17 of the sleeve 16, which sleeve is fast on the shaft 15. Said sleeves in the embodied form are yieldingly pressed together by a helical or coiled spring 24, which spring encircles the cylindrical portion of the sleeve 16, and is in compression between the end of the sleeve 19 and a suitable abutment on the sleeve 16. Said abutment as embodied is a collar 25. A screw 26 serves to fasten the collar 25 and the sleeve 16 together, and to fasten the sleeve 16 likewise to the shaft 15. Also by fastening and unfastening the screw 26, the entire shutter structure is adjustable longitudinally or axially with respect to the shaft 15. The shutter 20 has the light controlling blade or vane 27, and a counterweight or interrupter blade 28, although the adjusting mechanism is applicable to shutters of different forms.

In the operation of the device, the turning of the handle 5 will cause the film-feeding mechanism and the shutter shaft 15 to move in timed relation with each other. In adjusting the shutter upon its shaft, the ring 22 and the sleeve 19 fixed therewith may be slightly pressed backwardly or to the right in Fig. 3 to disengage the frictionally contacting conoidal surfaces 17, and any degree of angular adjustment may be thus given to the shutter 20 relative to the shaft 15, and upon releasing the sleeve 19, it springs back into firm frictional engagement in the sleeve 16 which is in fixed relation to its shaft 15. It will thus be understood that the adjustment angularly relative to its shaft of the shutter is simple, easy, practically instantaneous and can be made as minute as possible.

It will be understood further that departures may be made from the precise structure shown and described, within the scope of the appended claims, without departing from the principles of the invention and without sacrificing its chief advantages.

I claim—

1. In a moving picture projecting machine and in combination a rotary shutter shaft, a detachable member on said shaft having a part of its exterior of conoidal shape and having a part of its exterior of cylindrical shape the smaller end of said conoidal portion joining said cylindrical portion, a collar encircling said cylindrical part, a device for attaching said shaft, member and collar together, a rotary shutter, a sleeve upon which said shutter is mounted, said shutter carrying sleeve encircling said member, and being conoidably shaped interiorly to fit the conoidal exterior portion of said member, and a helical spring encircling said circular exterior portion of said member, said spring being in compression between said collar and said shutter carrying sleeve, whereby said shutter carrying sleeve is forced into firm contact with said conoidal portion of said member but is movable away therefrom against the pressure of said spring and thus may be angularly adjusted relatively to said shaft.

2. In a moving picture projecting machine and in combination a rotary shutter shaft, a member fixed on said shaft, said member having a part of its exterior of conoidal shape and another part of its exterior of cylindrical shape, the smaller end of said conoidal portion joining said cylindrical portion, a collar on said cylindrical portion spaced away from said conoidal portion, a sleeve encircling said member and having an internal conoidal portion fitting the conoidal exterior portion of said member, a rotary shutter carried by said sleeve, and a helical spring encircling said cylindrical portion of said member, said spring being in compression between said collar and said shutter carrying sleeve, whereby said shutter carrying sleeve is forced into firm contact with said conoidal portion of said member but is movable away therefrom against the pressure of said spring and thus may be angularly adjusted relatively to said shaft.

3. In a moving picture projecting machine and in combination a rotary shutter shaft, a member fixed on said shaft, said member having a part of its exterior of conoidal shape and another part of its exterior of cylindrical shape, the smaller end of said conoidal portion joining said cylindrical portion, a sleeve and a shutter carried thereon, said sleeve encircling said member and having an internal conoidal portion fitting said conoidal exterior portion of said member, an abutment on the cylindrical part of said member, a spring encircling said cylindrical part of said member and in compression between said abutment and said collar whereby said shutter carrying sleeve is forced into firm contact with said conoidal portion of said member but is movable away therefrom against the pressure of said spring and thus may be angularly adjusted relatively to said shaft.

4. In a moving picture projecting machine and in combination a rotary shutter shaft, a member fixed upon said shaft, said member having a part of its exterior of conoidal shape and another part of its exterior of cylindrical shape, the smaller end of said conoidal part joining said cylindrical part, a sleeve encircling said member and having an internal conoidal portion fitting said exterior conoidal portion of said member, a shutter carried by said sleeve, a spring pressing said sleeve into frictional engagement with said conoidal portion of said member, whereby said shutter carrying sleeve is forced into firm contact with said conoidal portion of said member but is movable away therefrom against the pressure of said spring and thus may be angularly adjusted relatively to said shaft.

5. In a moving picture projecting machine and in combination a rotary shutter shaft having a frictional surface rotating therewith, a shutter, a member upon which said shutter is mounted, said member having a frictional surface adapted to pass into and out of engagement with said first-mentioned frictional surface, and a spring tending to press said frictional surfaces into engagement and to hold them in position by frictional contact.

6. In a moving picture projecting machine and in combination a lens tube, means for intermittently feeding the film strip past said lens tube, a shaft rotating in definite time relation to said film feeding means, said shaft having a frictional surface rotating therewith, a shutter having a frictional surface in fixed relation thereto and a spring pressing said frictional surfaces into engagement with each other and to hold them in position by frictional contact.

In testimony whereof, I have signed my name to this specification, in the presence of two subscribing witnesses.

JOHN DARBY.

Witnesses:
  JOHN D. MORGAN,
  MARGARET WALSH.